US012675096B2

(12) United States Patent
Ens et al.

(10) Patent No.: US 12,675,096 B2
(45) Date of Patent: Jul. 7, 2026

(54) FIELD DEVICE AND FUNCTIONAL UNIT FOR THE FIELD DEVICE

(71) Applicant: Siemens Aktiengesellschaft, Munich (DE)

(72) Inventors: Wolfgang Ens, Linkenheim (DE); Slava Friesen, Rülzheim (DE); Robin Pramanik, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 361 days.

(21) Appl. No.: 18/284,905

(22) PCT Filed: Feb. 21, 2022

(86) PCT No.: PCT/EP2022/054224
§ 371 (c)(1),
(2) Date: Sep. 29, 2023

(87) PCT Pub. No.: WO2022/207186
PCT Pub. Date: Oct. 6, 2022

(65) Prior Publication Data
US 2024/0201667 A1 Jun. 20, 2024

(30) Foreign Application Priority Data

Mar. 31, 2021 (DE) .......................... 102021203290.7

(51) Int. Cl.
*G05B 19/418* (2006.01)
(52) U.S. Cl.
CPC .................. *G05B 19/41835* (2013.01); *G05B 2219/31229* (2013.01)
(58) Field of Classification Search
None
See application file for complete search history.

(56) References Cited

U.S. PATENT DOCUMENTS

| | | | |
|---|---|---|---|
| 8,359,125 B2 * | 1/2013 | Park .......................... | H02J 3/32 700/291 |
| 10,424,930 B2 | 9/2019 | Kech et al. | |

(Continued)

FOREIGN PATENT DOCUMENTS

| | | |
|---|---|---|
| DE | 102006011501 | 9/2007 |
| DE | 102008030315 | 12/2009 |

(Continued)

OTHER PUBLICATIONS

PCT International Search Report dated May 31, 2022 based on PCT/EP2022/054224 filed Feb. 21, 2022.

*Primary Examiner* — Sean Shechtman
(74) *Attorney, Agent, or Firm* — Cozen O'Connor

(57) ABSTRACT

A field device includes functional units and an energy supply, wherein the sum of consumed energy of all functional units is greater than the maximum energy suppliable to the field device from the energy supply, where priority is assignable to at least two functional units, a higher priority functional unit influences the energy consumption of a lower priority functional unit such that the total energy consumption from the energy supply by all functional units is not greater than the maximum energy suppliable to the field device from the energy supply, and a line to the energy supply thereof passes through the higher priority functional unit to influence the energy consumption of the lower priority functional unit, such that functional units can be flexibly retrofitted, upgraded, or replaced, and the complexity involved in adapting the energy management of the functional units can be kept low.

14 Claims, 3 Drawing Sheets

(56)        References Cited

U.S. PATENT DOCUMENTS

| | | | |
|---|---|---|---|
| 2011/0035576 | A1 | 2/2011 | Grittke et al. |
| 2017/0170659 | A1 | 6/2017 | Kech et al. |
| 2018/0253072 | A1 | 9/2018 | Seiler et al. |

FOREIGN PATENT DOCUMENTS

| | | |
|---|---|---|
| DE | 102008054088 | 5/2010 |
| DE | 102015115275 | 3/2017 |
| EP | 1442338 | 8/2004 |
| EP | 3182073 | 6/2017 |

* cited by examiner

FIG 5

FIELD DEVICE AND FUNCTIONAL UNIT FOR THE FIELD DEVICE

CROSS-REFERENCE TO RELATED APPLICATIONS

This is a U.S. national stage of application No. PCT/EP2022/054224 filed 21 Feb. 2022. Priority is claimed on German Application No. 10 2021 203 290.7 filed 31 Mar. 2021, the content of which is incorporated herein by reference in its entirety.

BACKGROUND OF THE INVENTION

1. Field of the Invention

The invention relates to a field device comprising a plurality of functional units and to a functional unit for such a field device.

2. Description of the Related Art

Industrial process automation technology frequently uses decentralized devices arranged in the field, i.e., arranged in the vicinity of a process to be monitored or controlled and, hence, outside a control room for controlling the process. Such devices are referred to as field devices. For example, they deliver information about the process (for example, measurement values for temperature, pressure, flow rate) and/or influence the process (for example, regulation of valve settings). Field devices that deliver information about a process are frequently also referred to as sensors or measuring transducers. Field devices that influence a process are frequently also referred to as actuators or actuating elements.

Field devices are also often not arranged in protective control cabinets, but are directly exposed to harsh environmental conditions and are also subject to the safety requirements for the process. As a result, field devices have to meet high requirements relating to quality, robustness and availability. Field devices must often be suitable for use in wide temperature ranges and must meet requirements relating to intrinsic safety and explosion protection.

In addition, increasing use is being made of "smart" or intelligent field devices having extensive communication, diagnostic, configuration and parametrization options as well as functions for data preprocessing.

Field devices are usually connected to the lowest level of an industrial communication network, for example, to a fieldbus, via which the field devices can deliver process information to higher-level facilities, such as control and/or regulating facilities or monitoring and diagnostic facilities for the process, or receive manipulated variables. Smart field devices can also provide information about themselves (operating status, configuration, SW version, firmware version) to higher-level process device management systems. Examples of communication mechanisms used in this context are HART, PROFIBUS, CAN or Ethernet-based: PROFINET, Ethernet IP, MODUBUS TCP, TSN or Single Pair Ethernet.

Field devices in the broader sense also generally include all other devices that are arranged in the immediate vicinity of the process in the field and connected to a communication system, such as to a fieldbus. Examples are remote I/Os that connect analog or binary sensors or actuators to the communication system or also to gateways or linking devices.

A particular challenge for many field devices is that, particularly due to safety requirements such as explosion protection, the supply of electrical energy for their operation is restricted.

To save on cabling, herein the energy supply and communication frequently occurs via a common conductor system. For example, the two-conductor technique (also called two-wire technique) is used via which communication signals are transmitted and energy is supplied to the energy supply of the field device via a common pair of lines. Here, a first wire or a first line is used for the outward path and a second wire or a second line is used for the return path. An example of this is a two-conductor loop according to the 4 to 20 mA standard. Communication according to the four-conductor technique can also be used.

Increasing use is also being made of Power over Ethernet (PoE) and Single Pair Ethernet (SPE) with which network-capable devices can also be supplied with electrical energy via an Ethernet cable. In the future, Ethernet Advanced Physical Layer (APL) will also be used. With this, communication and energy supply occurs via a single 2-core cable and it is particularly suitable for the special requirements of process industries.

Conventional alternatives to field devices with an external energy supply are self-sufficient field devices which are, for example, supplied with energy by an integrated battery. However, the energy provided is even more restricted, here.

Modularity in the design of the actual field devices is becoming increasingly important. For example, DE 10 2008 030 315 A1 discloses a modular field device consisting of a main electronics system and a plurality of modular components (or modules).

DE 10 2006 011 501 A1 discloses a field device with internal modularity, where all components that are indispensable for core functions are combined in a first component group and all components that are optional for extension functions are combined in a second component group. The components in the first group require a constant energy supply. The components in the second group are each combined to form functionally associated extension function modules that can be supplied separately and that can each be activated individually by a switchable energy supply as required.

Here, activation can be event-driven or periodic. With event-driven activation, a time period can be defined after which the component of the second group switches off its own voltage as the last step. However, further details as to who or what effects activation/deactivation of the components of the second group or flips the switch and hence influences the energy consumption of the components of the second group are not disclosed.

EP 3 182 073 A1 discloses a level measuring device with at least two functional units connected in series with respect to an external energy supply of the level measuring device. A decoupling circuit is located between the two functional units for distributing the available energy between the functional units as required. Here, a line for supplying energy to the functional unit with comparatively lower priority is routed through the decoupling circuit. The decoupling circuit is controlled, and hence the energy consumption of the functional unit with lower priority is influenced by a central higher-level control of the level measuring device.

DE 10 2015 115 275 A1 discloses a method for energy management of a process automation field device with a first module and at least one second module, where the field device is supplied with energy by a two-conductor bus. The first module, at least temporarily, consumes more energy than the two-conductor bus continuously delivers. Here, the second module is supplied continuously with energy by the two-conductor bus, where the operation of the first and second modules is controlled such that the second module takes precedence over the first module and the first module may possibly, at least temporarily, be non-operational. The second module communicates its operation to the first module and the first module adapts its operation such that all the energy required by the field device is provided by the two-conductor bus. Hence, the intelligence for the question as to whether, and if so how, the first module has to adapt its operation lies with the first module.

However, such a solution is difficult to implement in field devices that can be flexibly configured from different functional units. This particularly applies to field devices in which functional units can be flexibly retrofitted, upgraded to a different status (for example, also by software activation) or replaced by another functional unit. This is because retrofitting, upgrading or replacing a functional unit usually requires adaptation to the functional units already present or remaining in the field device to implement the energy management required for the field device.

SUMMARY OF THE INVENTION

In view of the foregoing, it is the object of the present invention to provide a field device in which functional units can be flexibly retrofitted, upgraded or replaced, where the effort required to adapt the energy management can be kept low.

This and other objects and advantages are achieved in accordance with the invention by a field device and a functional unit for such a field device, where the field device in accordance with the invention comprises a plurality of functional units and an energy supply for the field device, and where a sum of the individual energy consumptions of all the functional units is greater than a maximum value of energy that can be supplied to the field device from the energy supply. At least two of the functional units, preferably all the functional units, are assigned, or can be assigned, priorities, where a functional unit with a higher priority (hereinafter also referred to as a "higher-priority functional unit") influences the energy consumption of a functional unit with a comparatively lower priority (hereinafter also referred to as a "lower-priority functional unit") such that a total energy consumption from the energy supply by all the functional units is not greater than the maximum value of energy that can be supplied to the field device from the energy supply. In order to influence the energy consumption of the functional unit with the lower priority, a line to its energy supply is routed through the functional unit with the higher priority.

The energy supply line for the lower-priority functional unit is routed through the higher-priority functional unit. As a result, the higher-priority functional unit itself has direct access to the energy supply of the functional unit with lower priority and can independently influence it according to its own needs. When retrofitting, upgrading or replacing such a functional unit, the entire circuitry and logic for influencing the energy supply of the lower-priority functional unit can be provided integrated with the higher-priority functional unit. Hence, no, or only a few, changes to the rest of the field device are necessary.

The energy supply of the field device can receive its energy from external sources, for example, via an energy supply port, or from internal sources, for example, from an internal energy store (such as a battery).

In the case of an external energy supply, the energy can, for example, be supplied from a two-conductor bus that can be coupled to energy supply ports of the field device, where the two-conductor bus preferably serves for the joint transmission of signals and energy. However, external energy can also be supplied from a multi-conductor bus that can be coupled to energy supply ports of the field device, where the multi-conductor bus preferably serves for galvanically isolated transmission of signals and energy.

A very simple way of influencing the energy consumption of the lower-priority functional unit is enabled because the functional unit with the higher priority comprises a switch arranged in the line. This switch can then be opened or closed by the higher-priority functional unit itself, depending on its energy requirements and, hence, the lower-priority functional unit can be disconnected from the energy supply or also reconnected thereto.

Alternatively, the functional unit can comprise a controllable current-limiting element arranged in the line, for example, a controllable electrical resistor, in order to influence the energy consumption of the lower-priority functional unit.

In accordance with a structurally simple embodiment, the functional unit with the higher priority has a first port and a second port via which it is connected into the line, where the switch or the controllable current-limiting element is connected into a line section of the line routed from the first port to the second port.

Here, the switch or the controllable current-limiting element can advantageously be controlled directly by the functional unit with the higher priority. This makes it easy to retrofit, upgrade or replace the functional unit in the field device.

In accordance with a particularly simple embodiment of the invention, the priorities are permanently assigned to the at least two functional units. This permanent assignment can, for example, be implemented by a sequence in an arrangement of the functional units along a power supply line inside the field device. This sequence can, for example, result implicitly from an arrangement of mounting locations for the functional units in the field device.

Particularly in the case of functional units with changing energy consumption, on reconfiguration or upgrading of a field device, it can also be useful for the field device to be configured such that the priorities between the functional units are negotiable. This negotiation can occur, for example, coordinated by a central functional unit, on first commissioning, on each configuration change or on request by one of the functional units. A change or reassignment of priorities can then, for example, be realized by manual or automated adjustment of a sequence in an arrangement of the functional units along a power supply line inside the field device. This adjustment can, for example, occur by adapting the functional units to the power supply lines (i.e., the interconnection of line ports on the functional units to the power supply lines).

In accordance with a further embodiment with very simple circuitry, the line for supplying energy to the lower-priority functional unit also serves to supply energy to the higher-priority functional unit. The two functional units are then advantageously connected in series in descending priority in the line.

For simple and low-effort connection of a functional unit to communication within the field device, a communication link to the functional unit with the lower priority is also routed through the functional unit with the higher priority.

The communication link can then also serve for communication with the functional unit with the higher priority.

In accordance with a particularly simple embodiment, the two functional units are then connected in series in descending priority in the communication link. This enables the functional unit with the higher priority to influence (for example, interrupt) the communication traffic of the functional unit with the lower priority. Here, the functional unit with the higher priority can also comprise a repeater for the communication link.

In accordance with a particularly advantageous embodiment, at least one of the at least two functional units is configured as a functional module that can be retrofitted to the field device. Preferably, this module can be detachably fastened to the field device.

Suitable functional units or function modules are particularly those with significant energy consumption. Therefore, this preferably entails a communication module (in particular a radio module), a sensor module, a transmitter module, a display, a measurement data processing module, a control module or a regulator module. However, furthermore, it can also entail a service interface via which the maintenance staff can connect to the field device for the purpose of parameterization, configuration and diagnosis of the field device via a mobile device (for example, notebook, tablet, smartphone).

A functional unit in accordance with disclosed embodiments of the invention for a field device with a plurality of functional units comprises a first electrical port for connecting a line to an energy supply of the field device, a second electrical port for connecting a line for supplying energy to another functional unit of the field device and a line section routed through the functional unit from the first port to the second port, which is configured to connect the other functional unit to the energy supply of the field device. Here, the functional unit is preferably configured as a functional module that can be retrofitted and that can be detachably fastened to the field device.

In accordance with a particularly advantageous embodiment, a switch or a controllable current-limiting element is connected into the line section. This makes it very easy to influence the energy consumption of the lower-priority functional unit.

The switch or the controllable current-limiting element can preferably be controlled by the functional unit. This makes it easy to retrofit, upgrade or replace the functional unit in the field device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and further advantageous embodiments of the invention according to features of the subclaims are explained below in more detail with reference to exemplary embodiments, in which:

FIG. 5 is a schematic block diagram of a fourth exemplary embodiment of a field device in accordance with the invention.

DETAILED DESCRIPTION OF THE EXEMPLARY EMBODIMENTS

For simplification, a single-conductor representation has been selected in each of the figures. In reality, it should be understood there are in each case at least two conductors (forward conductor and return conductor).

Figure 1:
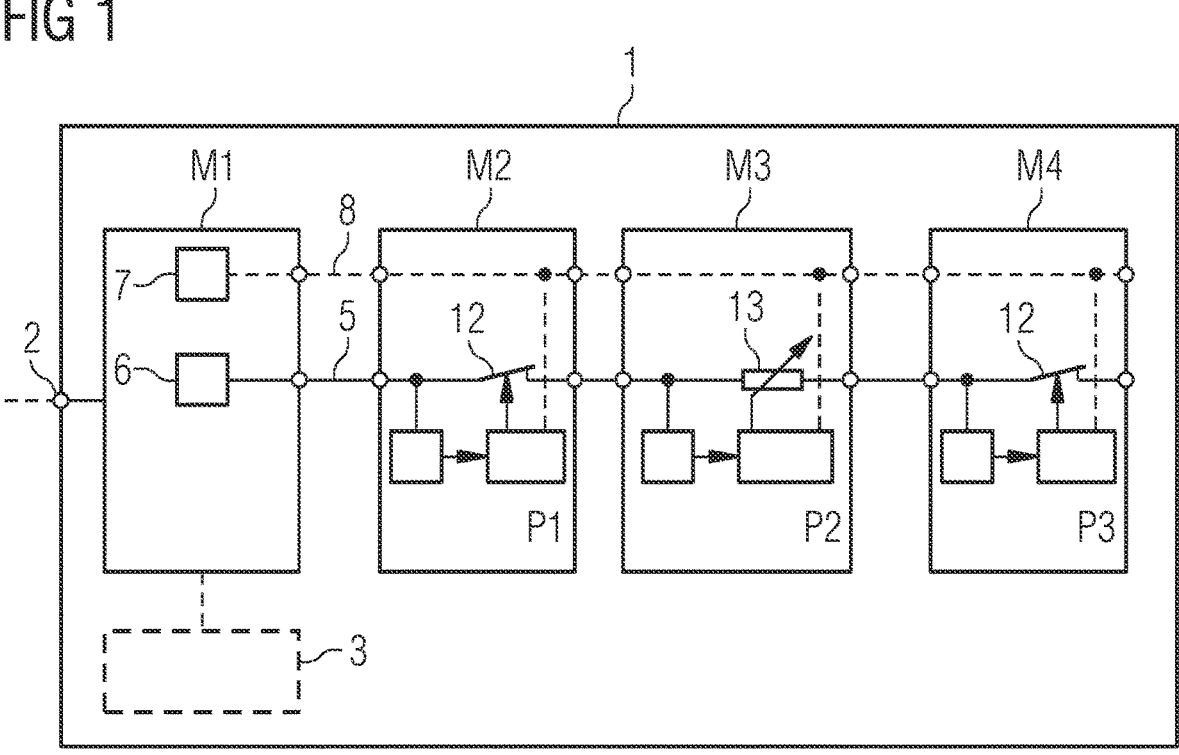
FIG. 1 is a schematic block diagram of a first exemplary embodiment of a field device in accordance with the invention.

A field device 1 shown in FIG. 1 in a simplified schematic representation comprises a plurality of functional units M1, M2, M3, M4, which are supplied with electrical energy from an energy supply 6 of the field device 1. The energy supply 6 can in turn obtain its energy directly or indirectly from external sources via an energy supply port 2, for example, via a two-conductor loop, which preferably serves for the joint transmission of signals and energy, or via a multiconductor loop, which serves for galvanically isolated transmission of signals and energy. Due to safety requirements, in particular explosion protection, the supply of external electrical energy via the port 2 is restricted. Alternatively, the energy supply 6 can also receive its energy from a battery 3 of the field device 1. Here, once again, the energy consumption or energy supply are restricted to ensure the longest possible battery life.

The functional unit M1 can, for example, be a central functional unit that provides the energy supply for the entire field device 1 and is responsible for central control of the field device 1 and communication between the functional units M1, M2, M3, M4.

The functional units M2, M3, M4 can, for example, be a sensor module, a transmitter module, a communication module (in particular a radio module), a display, a measurement data processing module, a control module or a regulator module.

A sensor module can serve to detect physical process variables, such as temperature, pressure, flow rate, vibrations, and/or level.

A transmitter module (frequently also referred to as a "measuring transducer") can be used to perform an analog/digital conversion of the measured values, possibly conditioning and/or preprocessing of the digitized measured values and further processing for subsequent communication of the digitized measured values to a remote receiver.

The communication of the digitized measured values to a remote receiver can occur in a wired or wireless manner via a communication module. A radio module can, for example, operate according to the WirelessHART, Bluetooth Low Energy, or 3G, 4G or 5G standards.

A display can serve for parameterization, configuration and diagnosis of a field device.

Maintenance staff can connect to the field device via a service interface by a mobile device (for example, notebook, tablet, smartphone) to the field device for the purpose of parameterization, configuration and diagnosis of the field device.

A measurement data processing module can serve for on-site analysis of measurement data. For example, statistical evaluations, KPI determinations and classifications of measurement data can occurs in accordance with EN 10816-6, -7, -3. Machine learning can be used to detect anomalies in measurement data to generate predictions regarding the future course of measurement data.

A control module serves to output setpoints for setting manipulated variables of a process (for example, a valve position). A regulator module serves accordingly to output setpoints for regulating process variables.

Hence, the field device 1 can be used to implement an intelligent field device with an external energy supply, such as, for example, a pressure measuring device, a flow rate device, a level measuring device, or also, for example, a self-sufficient multi-sensor that can be attached to a motor to detect vibrations and temperatures.

The functional units can be arranged within a housing of the field device 1. However, they can also be located outside such a housing. For example, a radio module for increasing the transmission range can be located outside the housing. The functional units or modules can each also have their own housing.

If a sum of the individual energy consumptions of all the functional units M1, M2, M3, M4 is now, at least temporarily, greater than a maximum value of energy which can be supplied from the energy supply 6, then energy management is necessary to ensure that the field device or the functional units are operated such a way that the total energy consumption of all the functional units M1, M2, M3, M4 is not greater than this maximum value. Otherwise, there is a risk that not enough energy will be available for the operation of the individual functional units, thereby endangering proper operation and resulting in unsafe conditions up to the failure of functional units or even the entire field device.

For this purpose, priorities P1, P2 or P3 are assigned, or can be assigned, to the functional units M2, M3, M4. For example, P1 denotes a highest priority, P2 a medium priority and P3 a lowest priority. Herein, a functional unit with a higher priority, here, for example, the functional unit M2, influences the energy consumption of a functional unit with a comparatively lower priority (here, for example, the functional unit M3) such that the maximum value for the total energy consumption is maintained.

To influence the energy consumption of the medium-priority functional unit M3, a line 5 for supplying energy to the medium-priority functional unit M3 is routed through the higher-priority functional unit M2. In a corresponding manner, the line 5 for supplying energy to the low-priority functional unit M4 is routed through the medium-priority functional unit M3.

Hence, the higher-priority functional unit itself in each case has direct access to the energy supply of the functional unit (s) with a comparatively lower priority and can influence it independently. When retrofitting, upgrading or replacing a higher-priority functional unit of this kind, here, for example, the functional unit M2, the entire circuitry and logic for influencing the energy supply of the lower-priority functional unit (s), here, for example, M3 (and M4), can be provided integrated with the higher-priority functional unit M2. Hence, no changes to the rest of the field device 1 or to the other functional units M1, M3, M4 are necessary.

In order to influence the energy consumption of the lower-priority functional unit M3, the higher-priority functional unit M2 has a switch 12 arranged in the line 5. This switch 12 can then be opened or closed by the higher-priority functional unit M2 depending upon its energy requirements and hence the lower-priority functional unit M3 can be disconnected from the energy supply 6 or also reconnected thereto.

In order to influence the energy consumption of the comparatively even lower-priority functional unit M4, the functional unit M3 in turn comprises a controllable current-limiting element 13 arranged in the line 9, for example, a controllable electrical resistor.

Here, the line 5 to the energy supply of the lower-priority functional unit in each case also serves to supply energy to the higher-priority functional unit in each case. For this purpose, the functional units M2, M3, M4 are connected in series in descending priority in the line 5.

In accordance with a particularly simple embodiment of the invention, the priorities are permanently assigned to the functional units M2, M3, M4. This permanent assignment can, for example, result solely from a sequence in an arrangement of the functional units along the energy supply line 5 inside the field device 1. This sequence can, for example, result implicitly from mounting locations for the functional units M2, M3, M4 in the field device 1.

Particularly in the case of functional units with changing energy consumption, in the case of reconfiguration or upgrading of a field device (for example, also via software activation), it may also be useful for the field device 1 to be configured such that the priorities between the functional units can be reallocated or even negotiated. This negotiation can take place, for example coordinated by the central functional unit M1, during initial commissioning, on each configuration change or after a request from one of the functional units M2, M3, M4. A change or reassignment of priorities can then, for example, be implemented by manual or automated setting of a sequence in an arrangement of the functional units along the line 5. This setting can, for example, be made by changing (or swapping) mounting locations of the functional units M2, M3, M4 in the field device 1 or, if the mounting location remains the same, by adapting the connection of the functional units M2, M3, M4 on the line 5 (i.e., the interconnection of line ports on the functional units M2, M3, M4 with the line 5).

A communication link 8 (for example, a communication bus) serves for communication between the central functional unit M1 and the functional units M2, M3, M4 and is connected to a communication component 7 (for example, a communication bus master) of the central functional unit M1 for this purpose. Here, the communication link 8 to a functional unit with a lower priority (here, for example, M3) is routed through the functional unit with the comparatively higher priority (here, for example, M2). Similarly to the case with the energy supply, the functional units M2, M3, M4 are also connected in series in descending priority in the communication link 8. This means that a higher-priority functional unit can also influence the communication of a lower-priority functional unit.

Figure 2:
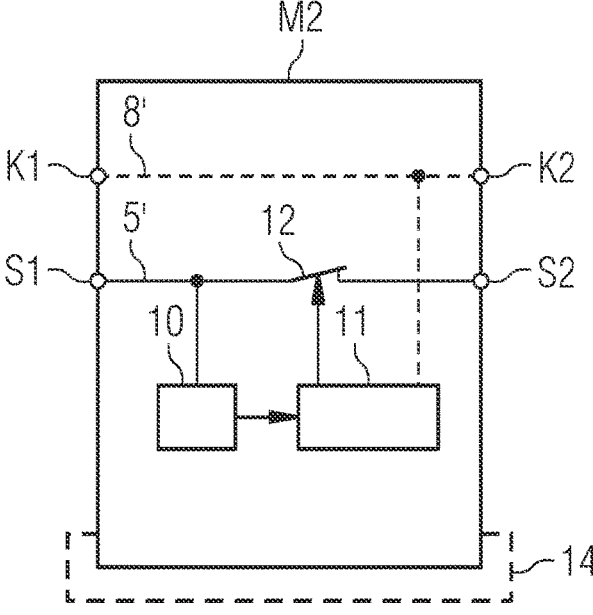
FIG. 2 is a detailed schematic block diagram of the functional unit of FIG. 1.

FIG. 2 is intended to explain a structure of a functional unit in accordance with the invention, here the functional unit M2 from FIG. 1 with reference to a schematic exemplary embodiment.

The functional unit M2 has a first electrical port S1 for connection to an energy supply of the field device 1, for example, the line 5 from the energy supply 6 according to FIG. 1. Furthermore, the functional unit M2 has a second electrical port S2 for connecting an energy supply line for another functional unit of a field device, here the line 5 to the functional unit M3. For this purpose, a line section 5' routed from the first port S1 to the second port S2 is configured to connect the functional unit M3 to the energy supply 6 via the line 5. Here, the switch 12 is connected into the line section 5'.

In addition, the functional unit M2 has a first communication port K1 for connection to a communication line, here, for example, the communication line 8 from the communication component of the central functional unit M1 in accordance with FIG. 1. Furthermore, the functional unit M2 has a second communication port K2 for connecting a communication line for another functional unit of a field device, here the line 8, to the functional unit M3. A line 8' routed from the first port K1 to the second port K2 is embodied to connect the functional unit M3 to the communication component 7 via the line 8.

The functional unit M2 further comprises its own power supply 10 and a controller 11 (for example, a microcontroller 11). The power supply 10 is connected to the line section 5' between the port S1 and the switch 12 and is supplied with energy from the line 5. The controller 11 is connected to the communication line 8' between the ports K1 and K2 (depending on the type of communication link, it can also be routed through the controller 11). The controller 11 is configured to generate a control signal for opening or closing the switch 12.

Here, the functional unit M2 is preferably configured as a functional module that can be retrofitted and can be detachably fastened to the field device 1 of FIG. 1 via a fastening facility 14.

Figure 3:
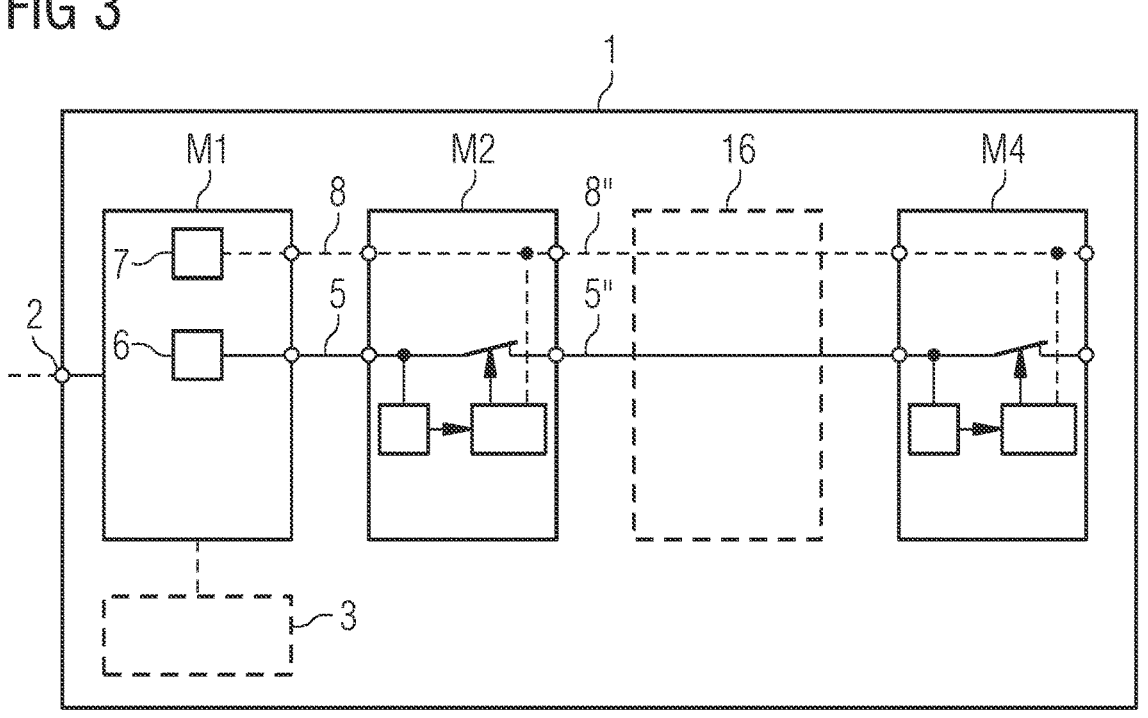
FIG. 3 is a second exemplary embodiment of a field device in accordance with the invention.

FIG. 3 shows the field device 1 in FIG. 1, where, however, the functional unit M3 is not integrated into the field device 1. Consequently, a mounting location 16 in the field device 1 for the functional unit M3 is not occupied. Here, the power supply line 5 is bridged via a line section of a 5" between the functional units M2 and M4. Similarly, the communication line 8 is bridged between the functional units M2 and M4 by means of a line section 8".

Figure 4:
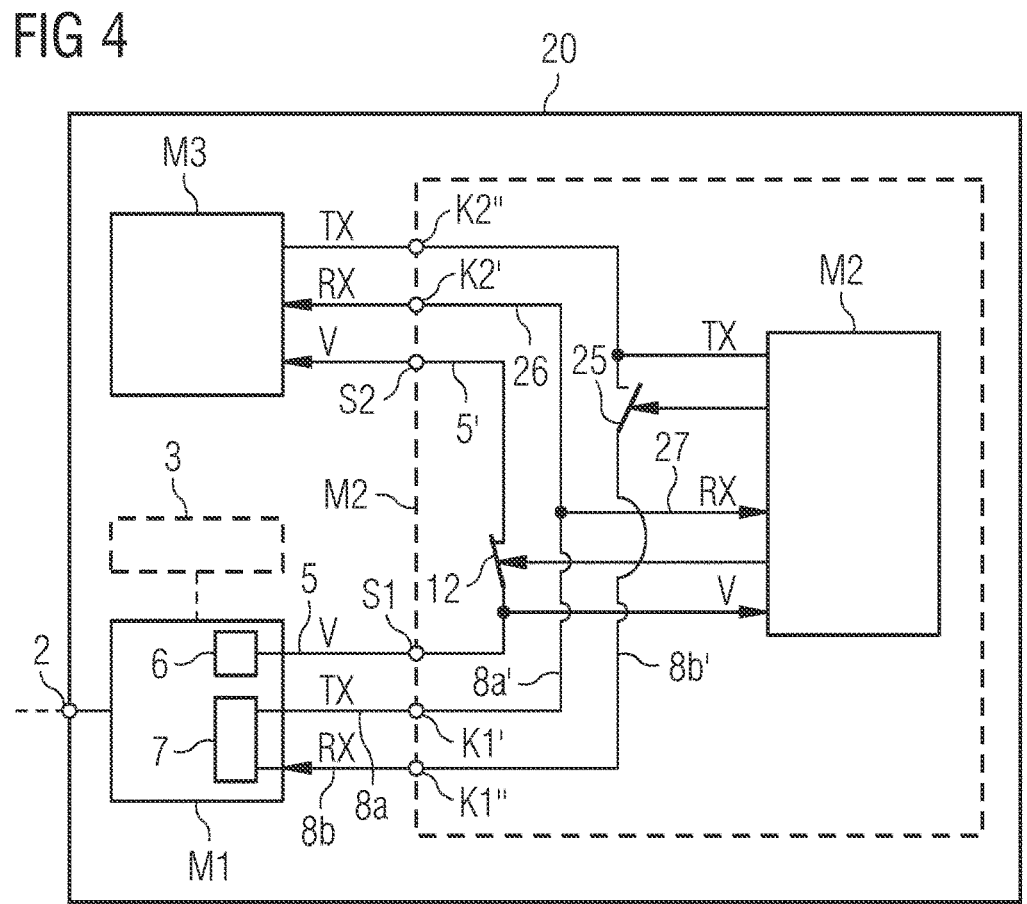
FIG. 4 is a schematic block diagram of a third exemplary embodiment of a field device in accordance with the invention.

FIG. 4 shows a further exemplary embodiment of a field device in accordance with the invention. Components corresponding to those in FIGS. 1 to 3 are given the same reference symbols. A field device 20 shown in FIG. 4 has three functional units M1, M2, M3. The functional unit M1 is configured as a central transmitter module coupled to a sensor (not shown in further detail) for detecting, for example, pressure, temperature, level etc. The functional unit M2 is formed as a radio module and the functional unit M3 is formed as a display. The radio module M2 is assigned a higher priority than the display M3.

If a display M3 is present, then the radio module M2 can switch off the display M3 via the switch 12 and use the additional energy that the display M3 would otherwise require for the display for the radio module M2. This is, for example, the case when the radio module M2 temporarily requires more energy for a transmit operation. The transmitter module M1 does not even notice that the display M3 is showing nothing if the radio module M2 behaves like the display M3.

In contrast to FIGS. 1 and 2, the communication line 8 is now divided into two lines 8a and 8b. Line 8a serves to transmit data from the transmitter module M1 to the radio module M2 and the display M3. Conversely, line 8b serves to transmit data from the radio module M2 and the display M3 to the transmitter module M1. Here, TX denotes a transmit output, RX denotes a receive output and V denotes an input or output for the energy supply line 5. Correspondingly, two first communication ports K1', K1" and two second communication ports K2', K2" are also provided on the radio module M2.

The switch 25 can also be used to enable the radio module M2 to switch off communication to the display M3.

Data continues to be transmitted from the transmitter module M1 to the display M3 on the line 8a'. In addition, the radio module M2 transmits data to the transmitter via the line 8b' and receives the corresponding responses. However, data from the transmitter module M1 to the radio module M2 is not forwarded to the display because of the switch 25. Even if there is no display on the field device 20, communication can then occur between the radio module M2 and the transmitter module M1.

Herein, as shown in FIG. 4, the communication link from the transmitter module M1 to the radio module M2 and to the display M3 can occur via a parallel connection over the two line paths 26, 27 so that the radio module M2 and the display M3 are in parallel, and isolation by the switch 25 only occurs for the transmission to the transmitter module M1. The result of this is that the display M3 also receives the responses to requests from the radio module M2.

Figure 5:
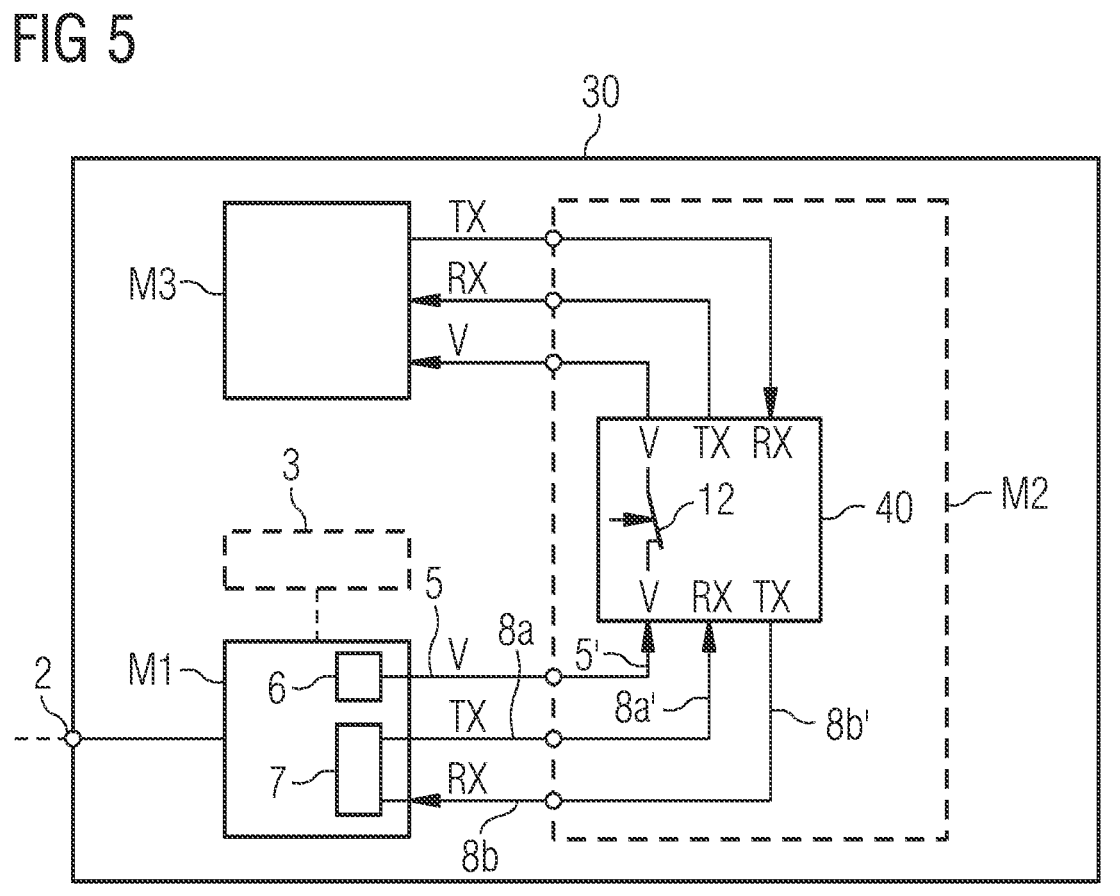

In an alternative embodiment to FIG. 4 shown in FIG. 5, in a field device 30, the radio module M2 comprises an intelligent repeater 40 connected into the lines 5, 8a and 8b. This repeater 40 first receives messages from the transmitter M1 or display M3 and forwards them if they are directed to the display M3 or the transmitter module M1 or does not forward them if they are for the radio module M2. The parallel connection in accordance with FIG. 4 is useful for bus-type interfaces (for example, I$^2$C), while the store-and-forward method in accordance with FIG. 5 is advantageous for point-to-point connections (for example, UARTs).

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A field device comprising:
   a plurality of functional units; and
   an energy supply for the field device;
   wherein a sum of the individual energy consumptions of all of the plurality of functional units is greater than a maximum value of energy which is suppliable to the field device from the energy supply;
   wherein at least two functional units of the plurality of functional units are one of assigned and assignable priorities;
   wherein a functional unit with a higher priority influences the energy consumption of a functional unit of the plurality of functional units having a comparatively lower priority such that a total energy consumption from the energy supply by all of the plurality of functional units is not greater than a maximum value of energy which is suppliable to the field device from the energy supply;

wherein a line to the energy supply thereof is routed through a functional unit having a higher priority, said functional unit having the higher priority comprising a switch arranged in the line or a controllable current-limiting element arranged in the line to influence energy consumption of the functional unit with the lower priority;

wherein the switch or the controllable current-limiting element is controllable by the functional unit having the higher priority;

wherein an entire circuitry and logic for influencing the energy supply of functional unit having the lower priority is integrable with the functional unit having the higher priority;

wherein the functional unit having the higher priority is formed as a functional module which is retrofittable to the field device, is detachably fastened to the field device, is within a respective housing and is further formed as one of (i) a transmitter module, (ii) a display, (iii) a communication module, (iv) a sensor module, (v) a service interface, (vi) a measurement data processing module, (vii) a control module and (vii) a regulator module.

2. The field device as claimed in claim 1, wherein the functional unit having the higher priority includes a first port and a second port via which said functional unit having the higher priority is connected into the line; and wherein the switch or the controllable current-limiting element is connected into a line section of the line which is routed from the first port to the second port.

3. The field device as claimed in claim 1, wherein priorities are permanently assigned to the at least two functional units.

4. The field device as claimed in claim 1, wherein the field device is configured such that priorities between the at least two functional units are negotiable.

5. The field device as claimed in claim 2, wherein the field device is configured such that priorities between the at least two functional units are negotiable.

6. The field device as claimed in claim 1, wherein the line further serves to supply energy to the functional unit having the higher priority.

7. The field device as claimed in claim 6, wherein the at least two functional units are connected in series in descending priority in the line.

8. The field device as claimed in one claim 1, wherein a communication link to the functional unit having the lower priority is additionally routed through the functional unit having the higher priority.

9. The field device as claimed in claim 8, wherein the communication link additionally serves to provide communication with the functional unit having the higher priority.

10. The field device as claimed in claim 9, wherein the at least two functional units are connected in series in descending priority in the communication link.

11. The field device as claimed in claim 8, wherein the functional unit having the higher priority comprises a repeater for the communication link.

12. The field device as claimed in claim 9, wherein the functional unit having the higher priority comprises a repeater for the communication link.

13. The field device as claimed in claim 10, wherein the functional unit having the higher priority comprises a repeater for the communication link.

14. The field device as claimed in claim 1, wherein the communication module comprises a radio module.

* * * * *